(12) United States Patent
Lee et al.

(10) Patent No.: US 11,269,238 B2
(45) Date of Patent: Mar. 8, 2022

(54) CAMERA MODULE

(71) Applicant: Samsung Electro-Mechanics Co., Ltd., Suwon-si (KR)

(72) Inventors: Cheong Hee Lee, Suwon-si (KR); Tae Young Choi, Suwon-si (KR); Hong Sik Yang, Suwon-si (KR); Chang Uk Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 79 days.

(21) Appl. No.: 16/862,717

(22) Filed: Apr. 30, 2020

(65) Prior Publication Data

US 2021/0181602 A1 Jun. 17, 2021

(30) Foreign Application Priority Data

Dec. 16, 2019 (KR) .................. 10-2019-0167950

(51) Int. Cl.
*G03B 17/12* (2021.01)
(52) U.S. Cl.
CPC .................................. *G03B 17/12* (2013.01)
(58) Field of Classification Search
CPC ...................................................... G03B 17/12
See application file for complete search history.

(56) References Cited

FOREIGN PATENT DOCUMENTS

| JP | 2006-332814 A | 12/2006 |
| KR | 10-0862485 B1 | 10/2008 |
| KR | 10-2018-0017590 A | 2/2018 |
| KR | 10-2018-0060522 A | 6/2018 |
| KR | 10-2018-0128745 A | 12/2018 |

OTHER PUBLICATIONS

Korean Office Action dated Sep. 28, 2020 in the counterpart of Korean Patent Application No. 10-2019-0167950, (5 pages in English, 4 pages in Korean).

*Primary Examiner* — Clayton E. LaBalle
*Assistant Examiner* — Diana Hancock
(74) *Attorney, Agent, or Firm* — NSIP Law

(57) ABSTRACT

A camera module includes a lens module to accommodate a lens; a substrate; an image sensor disposed on the substrate; a support member coupled to the lens module to define a gap between the image sensor and the lens module; a first adhesive member fixing a location of the support member with respect to the substrate; a second adhesive member fixing a location of the lens module with respect to the support member; a first housing coupled to the lens module; and a second housing to accommodate the substrate and coupled to the first housing.

17 Claims, 15 Drawing Sheets

A-A

CAMERA MODULE

CROSS-REFERENCE TO RELATED APPLICATION(S)

This application claims the benefit under 35 USC 119(a) of Korean Patent Application No. 10-2019-0167950 filed on Dec. 16, 2019 in the Korean Intellectual Property Office, the entire disclosure of which is incorporated herein by reference for all purposes.

BACKGROUND

1. Field

The following description relates to a camera module in which a distance between a lens and a sensor can be adjusted during a process of assembling the camera module.

2. Description of Background

A camera module includes a lens module and an image sensor. The lens module includes one or more lenses. The lens accommodated in the lens module has a predetermined back focal length (BFL). The back focal length refers to a distance between an image side surface of a lens (hereinafter, "rear lens") disposed closest to an image side (that is, the image sensor) and a point at which an image is formed.

The camera module can achieve high quality resolution only when an actual distance from the image side of the rear lens to the image sensor matches the BFL. As a wide-angle camera module has a small BFL deviation, it is easy to match the actual distance between the rear lens and the image sensor with a BFL value. In the case of a telephoto camera module, however, a BFL deviation is large, thereby making it difficult to match the actual distance between the rear lens and the image sensor to the BFL value.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module in which a distance between a rear lens and an image sensor can be easily adjusted, irrespective of a magnitude of a back focal length (BFL) deviation.

In one general aspect, a camera module includes a lens module to accommodate a lens; a substrate; an image sensor disposed on the substrate; a support member coupled to the lens module to define a gap between the image sensor and the lens module; a first adhesive member fixing a location of the support member with respect to the substrate; a second adhesive member fixing a location of the lens module with respect to the support member; a first housing coupled to the lens module; and a second housing to accommodate the substrate and coupled to the first housing.

A first groove to accommodate the second adhesive member may be disposed in the support member or the lens module.

The first groove may be elongated from an outer circumferential surface of support member toward an outer circumferential surface of the lens module.

The first groove may be disposed in a contact region of the lens module and the support member.

The first groove may be formed in a spiral shape on an outer circumferential surface of the lens module or an inner surface of the support member.

The first groove may extend along an optical axis direction of the lens module.

The lens module may include a guide protrusion and the support member may include a guide groove to interact with the guide protrusion to guide a movement of the lens module in an optical axis direction.

The lens module may include a protrusion that is elongated in a direction intersecting an optical axis to define a minimum distance between the lens module and the image sensor along the optical axis.

The support member may have a first thickness along a direction perpendicular to an optical axis at an object-side end of the support member and a second thickness, which is different from the first thickness, along the direction perpendicular to the optical axis at an image-side end of the support member.

The first thickness may be greater than the second thickness.

The first adhesive member may be disposed between the image-side end of the support member and the substrate along a direction parallel to the optical axis.

The second adhesive member may be disposed between the object-side end of the support member and the lens module along a direction parallel to the optical axis.

The second adhesive member may be disposed between the object-side end of the support member and the lens module along the direction perpendicular to the optical axis.

The second adhesive member may be disposed between the object-side end of the support member and the lens module along a direction parallel to the optical axis and along the direction perpendicular to the optical axis.

In another general aspect, a camera module includes a lens module to accommodate a lens; a support member to accommodate a portion of the lens module; a first adhesive member coupling a substrate with the support member; a fastener to fasten the lens module to the support member; a first housing coupled to the lens module; and a second housing to accommodate the substrate and coupled to the first housing.

The fastener may be formed in one or both of the lens module and the support member in a spiral shape.

The fastener may include a bolt configured to penetrate the support member and elongated to an outer circumferential surface of the lens module.

The camera module may include a second adhesive member disposed between the lens module and the support member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
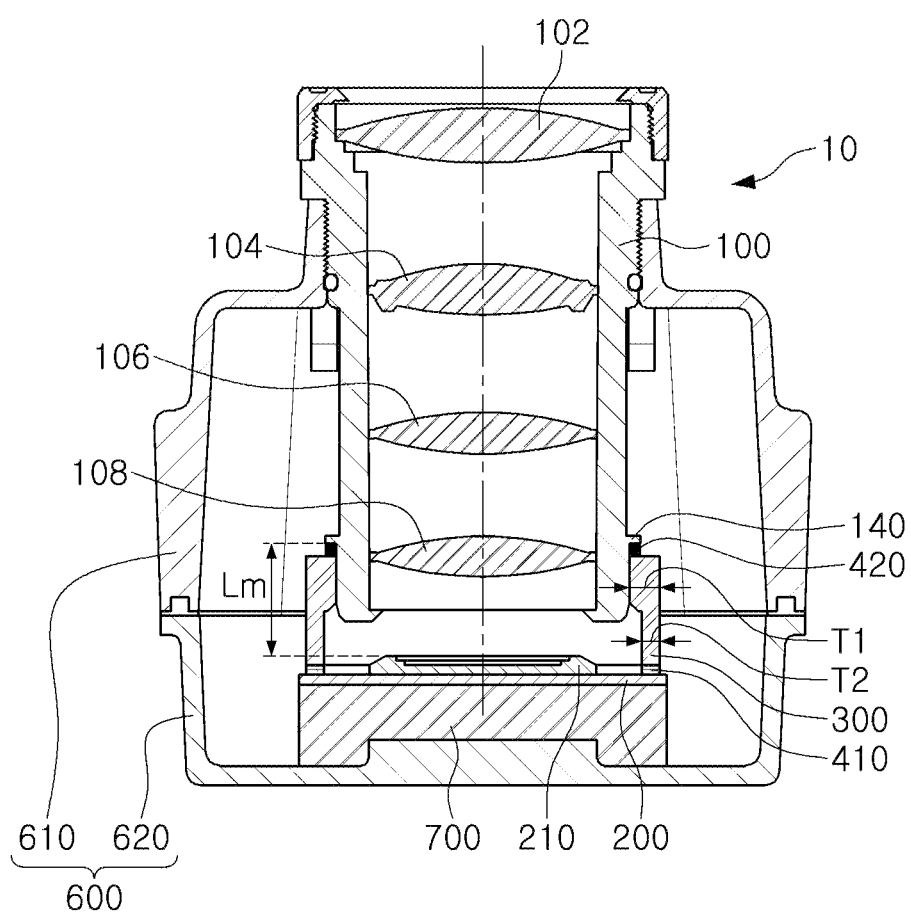
FIG. 1 is a configuration diagram of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to an example will be described with reference to FIG. 1.

A camera module 10 includes a lens module 100, a substrate 200 and a support member 300, but is not limited to such a configuration. For example, the camera module 10 may further include a housing 600 capable of integrally accommodating the lens module 100, the substrate 200 and the support member 300.

The lens module 100 may include one or more lenses 102, 104, 106 and 108. For example, the lens module 100 may consist of 4 lenses, but is not limited to such a configuration.

The lenses 102, 104, 106 and 108 may configure a single optical system capable of exhibiting certain optical characteristics. For example, a first lens 102, a second lens 104, a third lens 106 and a fourth lens 108 may configure a telephoto optical system capable of remote image capturing. The lenses 102, 104, 106 and 108 may have refractive power. For example, the first to fourth lenses 102 to 108 may each have positive or negative refractive power. The lenses 102, 104, 106 and 108 may each have a convex or concave refracting surface. For example, at least one of an object side surface and an image side surface may have a convex or concave shape. The optical system configured by the first to fourth lenses 102 to 108 may have a predetermined BFL.

The substrate 200 may provide a space in which an electric component is disposed. For example, an image sensor 210 and a passive element may be built in the substrate 200. The image sensor 210 may convert an optical signal refracted by the optical system into an electric signal. The image sensor 210 may be provided in the form of a charge-coupled device (CCD).

The support member 300 may be configured to maintain a distance between the lens module 100 and the image sensor 210 at a predetermined distance. For example, the support member 300 is disposed between the lens module 100 and the substrate 200 to keep the lens module 100 and the image sensor 210 in a predetermined distance.

The support member 300 may be coupled to the lens module 100. For example, the support member 300 may be in surface contact with the lens module 100. The support member 300 may accommodate a portion of the lens module 100. For example, a lower portion of the lens module 100 may be accommodated inside the support member 300. The lens module 100 may move in an optical axis direction while being in contact with the support member 300. Accordingly, a distance between the lens module 100 and the image sensor 210 may be adjusted, even when the lens module 100 and the support member 300 are coupled to each other.

The support member 300 may be configured to have different thicknesses in the optical axis direction. For example, an upper portion (for example, a portion closest to an object side) of the support member 300 may be formed to have a first thickness T1, while a lower portion (for example, a portion closest to an object side) of the support member 300 may be formed to have a second thickness T2. The upper portion of the support member 300 is configured to be coupled to the lens module 100. The upper portion of the support member 300 may be formed to be considerably thick, such that the lens module 100 is firmly supported. The lower portion of the support member 300 is configured to be coupled or attached to the substrate 200. The lower portion of the support member 300 may be formed to be thinner than the upper portion of the support member 300 so that a contact surface area with the substrate 200 is minimized. That is, the first thickness T1 may be greater than the second thickness T2.

The lens module 100 may include a constitution allowing a minimum distance between the lens module 100 and the image sensor 210 to be defined. For example, a protrusion 140 elongated in a direction intersecting the optical axis may be formed in the lens module 100. The protrusion 140 may be in contact with the support member 300. For example, the protrusion 140, having been moved toward the image sensor 210 side by a predetermined distance Lm, may be in contact with the support member 300 not to allow the lens module to additionally move.

The camera module 10 includes a constitution for firmly maintaining coupling between members. For example, the camera module 10 may include adhesive members 410 and 420.

The first adhesive member 410 can firmly maintain a coupling state between the substrate 200 and the support member 300. For example, the first adhesive member 410 is applied between the substrate 200 and the support member 300 to firmly fix a position of the support member 300 with respect to the substrate 200.

The second adhesive member 420 can firmly maintain coupling between the lens module 100 and the support member 300. For example, the second adhesive member 420 is applied between the lens module 100 and the support member 300 to firmly fix a position of the lens module 100 with respect to the support member 300.

The housing 600 is configured to accommodate the lens module 100, the substrate 200 and the support member 300.

The housing 600 includes a first housing 610 and a second housing 620. The first housing 610 is coupled to the lens module 100 while the second housing 620 is coupled to the substrate 200. The second housing 620 may include a bracket 700 for supporting the substrate 200. The bracket 700 may be configured to dissipate heat generated from the substrate 200 while supporting the substrate 200.

The housing 600 may fix a relative position of the image sensor 210 with respect to the lens module 100. For example, the first housing 610 coupled to the lens module 100 is coupled to the second housing 620 coupled to the substrate 200 to firmly maintain the positions of the substrate 200 and the image sensor 210 with respect to the lens module 100.

Figure 2A:
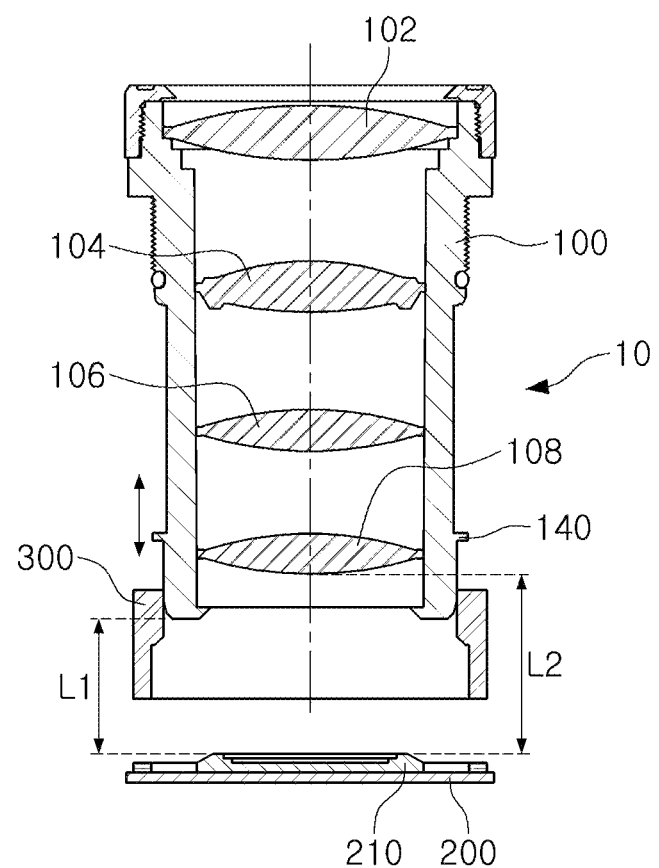
FIGS. 2A, 2B, and 2C are diagrams illustrating an assembly process of the camera module illustrated in FIG. 1.
Figure 2B:
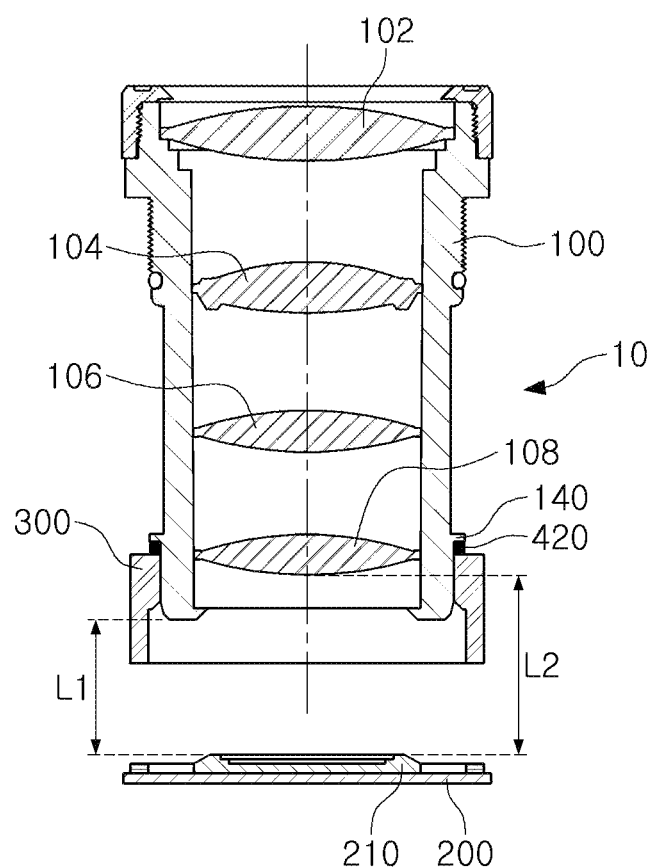
Figure 2C:
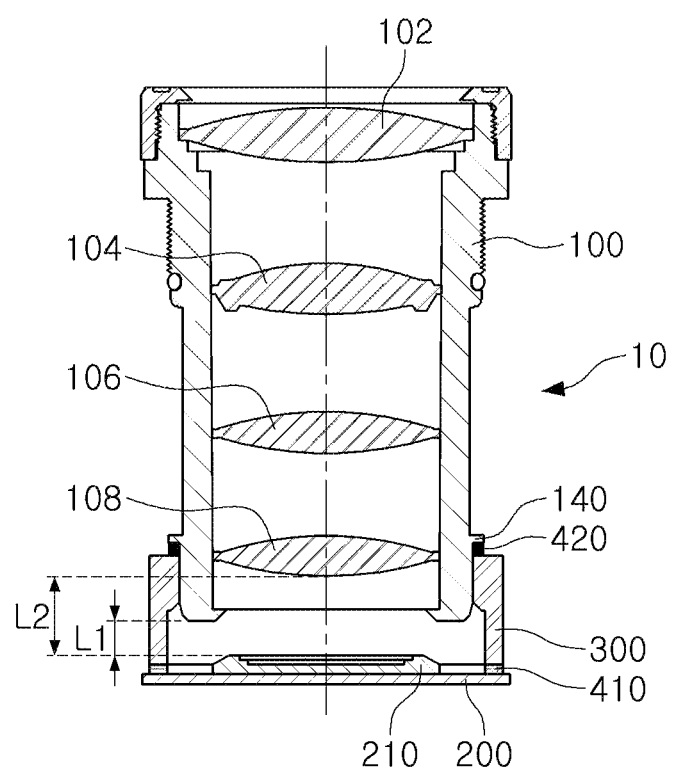

An assembly process of a camera module according to an example will be described with reference to FIGS. 2A, 2B, and 2C.

A camera module 10 is configured to adjust a distance between a lens module 100 and an image sensor 210. For example, the camera module 10 may vary a distance between a lower portion of the lens module 100 and the image sensor 210 through an assembly process of the lens module 100, the substrate 200 and the support member 300 in order.

A first rear distance L1 from the lower portion of the lens module 100 to the image sensor 210 may be adjusted through several assembly processes. For example, the rear distance L1 may be adjusted in a first assembly process in which the lens module 100 and the support member 300 are assembled and a second assembly process in which the substrate 200 and the support member 300 are assembled.

The first rear distance L1 may be adjusted to be large during the first assembly process. For example, the first rear distance L1 may be adjusted by moving the lens module 100 in an upper direction or a lower direction with respect to the support member 300. During the first assembly process, the first rear distance L1 may be adjusted such that a deviation between the BFL and a second rear distance L2 (a distance between the image sensor 210 and an image side surface of the fourth lens 108) falls within a first set range (0.2 mm to 0.3 mm). When the second rear distance L2 satisfies the range, the second adhesive member 420 may be applied between the lens module 100 and the support member 300. The second rear distance L2 may be adjusted while having the second adhesive member 420 applied between the lens module 100 and the support member 300.

The first rear distance L1 may be adjusted to have a minute size during the second assembly process. For example, the first rear distance L1 may be adjusted by adjusting a distance between the substrate 200 and the support member 300. During the second assembly process, the first rear distance L1 may be adjusted such that the deviation between the BFL and the second rear distance L2 falls within a tolerance range. When the first rear distance L1 is determined through a movement of the support member 300, the first adhesive member 410 may be applied between the substrate 200 and the support member 300. Alternatively, the first rear distance L1 may be adjusted by moving the supporting member 300 while having the first adhesive member 410 applied between the substrate 200 and the support member 300.

The camera module 10 manufactured through the assembly process as described above may achieve a high resolution as the distance from the lens module 100 to the image sensor 210 is adjusted in multiple steps. For example, the camera module 10 according to the example may match the second rear distance L2 with the BFL of the optical system constituting the lens module 100, thereby alleviating resolution degradation caused by a mismatch of the BFLs.

Hereinbelow, a modified example of the camera module will be described. For reference, components the same as those of the above examples in the following drawings use the same reference numerals, and detailed descriptions of these components, will be omitted.

Figure 3:
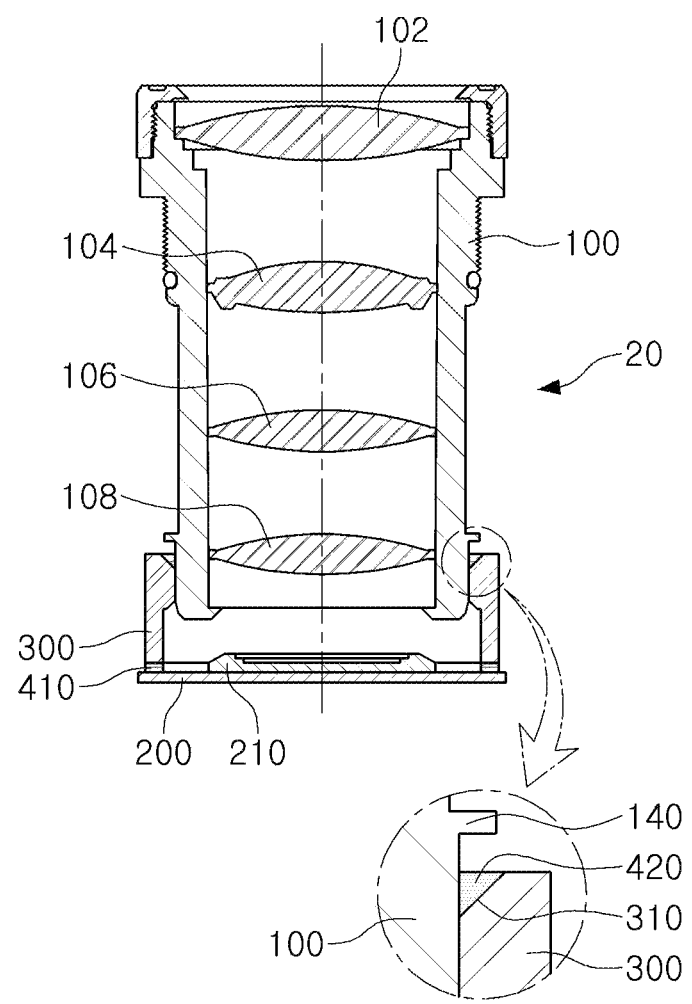
FIG. 3 is a configuration diagram of a first modified example of the camera module illustrated in FIG. 1.

A first modified example of the camera module will be described with reference to FIG. 3.

A camera module 20 according to the example includes a modified support member 300. For example, the support member 300 is configured to improve a binding force with a lens module 100.

A space for accommodating a second adhesive member 420 is formed in the support member 300. For example, one or more first grooves 310 are formed in a contact region (an inner circumferential surface of the support member 300) of the lens module 100 and the support member 300.

The camera module 20 configured as described above provides a space to which the second adhesive member 420 is sufficiently applied, and thus can improve the binding force between the lens module 100 and the support member 300.

Figure 4:
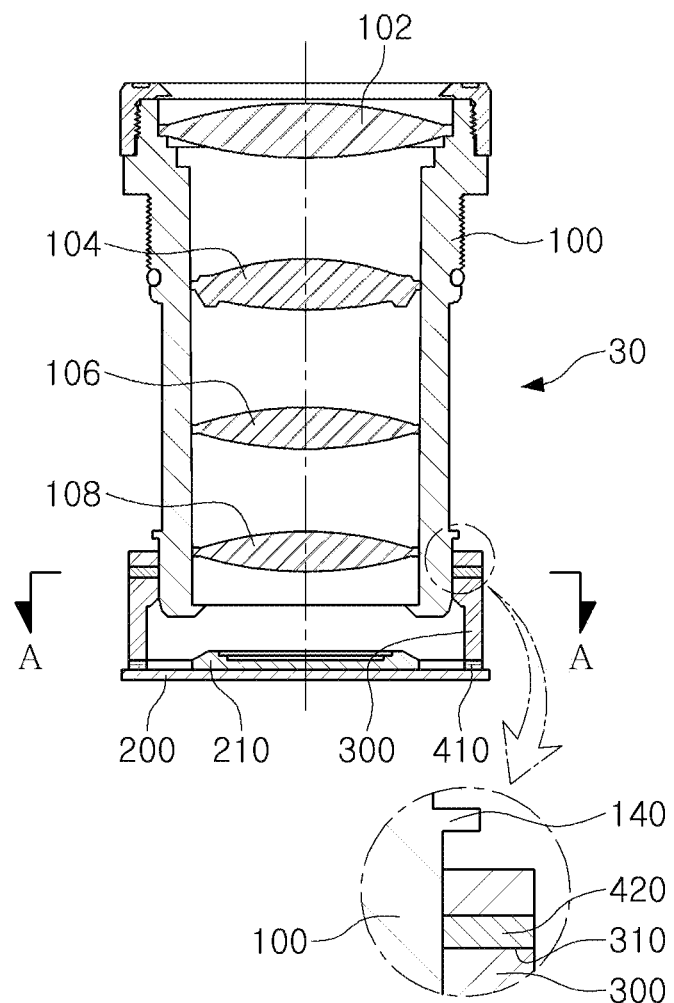
FIG. 4 is a configuration diagram of a second modified example of the camera module illustrated in FIG. 1.
Figure 5:
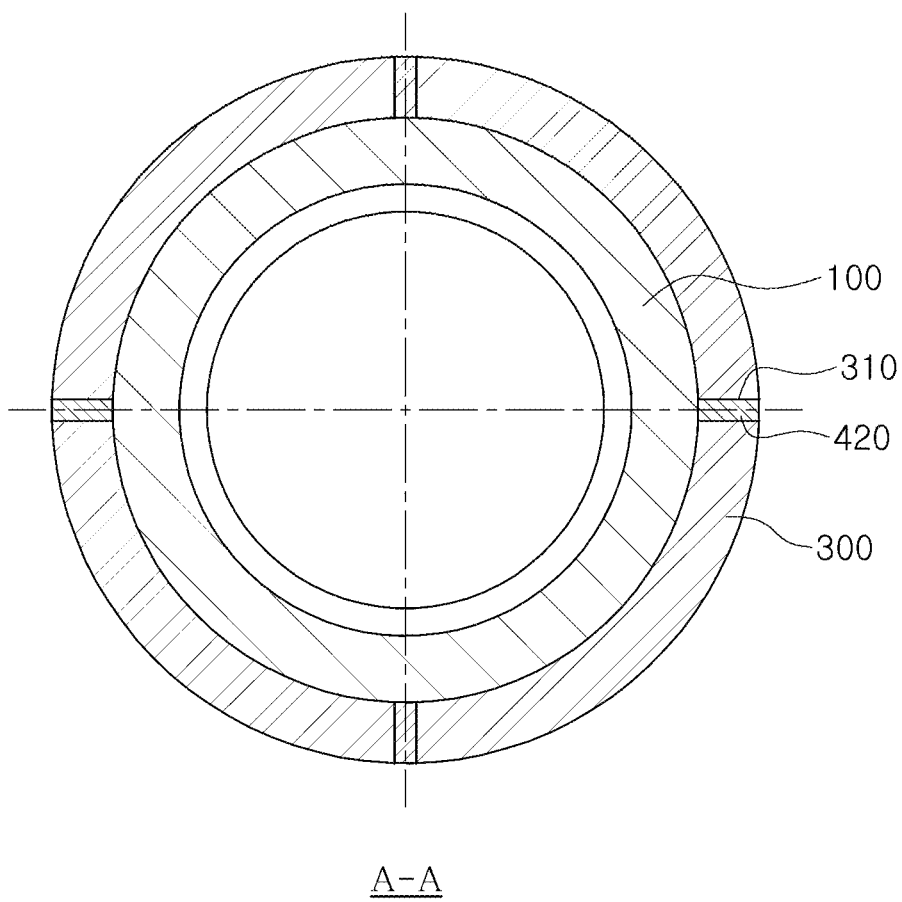
FIG. 5 is a cross-sectional view of the camera module illustrated in FIG. 4 taken along line A-A.

A second modified example of the camera module will be described with reference to FIGS. 4 and 5.

The camera module 30 includes a modified support member 300. For example, the support member 300 is configured to enable quick assembling of the camera module 30 while further improving the binding force to the lens module 100.

A space for accommodating a second adhesive member 420 is formed in the support member 300. For example, one or more first grooves 310 elongating in an outer circumferential surface direction of the lens module 100 from an outer circumferential surface of the support member 300 are formed in the support member 300. As illustrated in FIG. 5, the first groove 310 is formed at a predetermined interval along the circumferential surface of the support member 300.

As the camera module 30 configured as described above can be introduced with a second adhesive member 420 in the outer circumferential surface direction of the support member 300, the camera module 30 can be quickly assembled.

Figure 6:
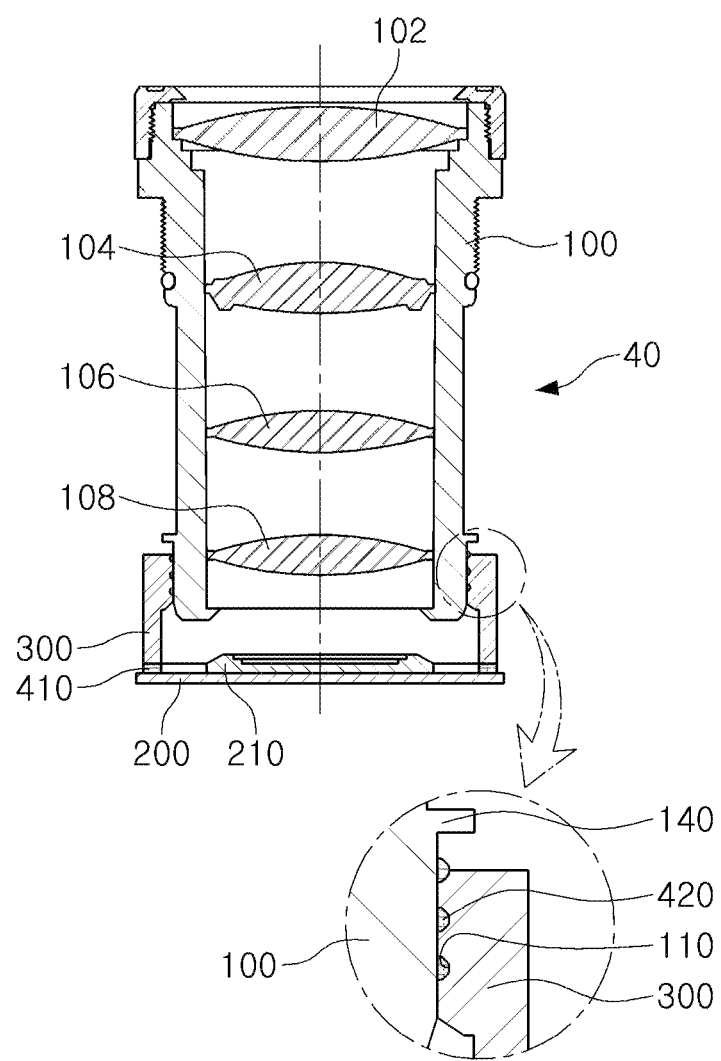
FIGS. 6 and 7 are configuration diagrams of a third modified example of the camera module illustrated in FIG. 1.
Figure 7:
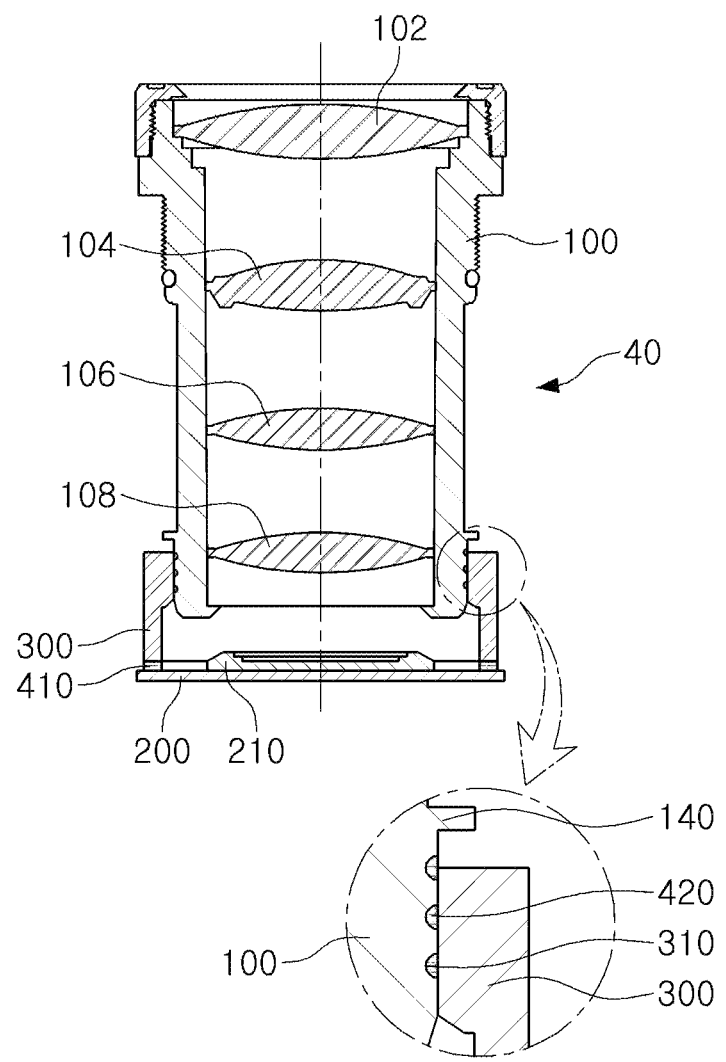

A third modified example of the camera module will be described with reference to FIGS. 6 and 7.

A camera module 40 includes a modified lens module 100 or support member 300. For example, the lens module 100 or the support member 300 may be configured to improve a binding force therebetween.

A space in a spiral form is formed for accommodating a second adhesive member 420 in the lens module 100 or the support member 300. For example, first grooves 110 and 310 in the spiral form may be formed on an outer circumferential surface of the lens module 100 or an inner circumferential surface of the support member 300 such that the second adhesive member 420 is introduced. The first grooves 110 and 310 may be formed to be exposed externally to enable easy introduction of the second adhesive member 420. The first grooves 110 and 310 may be formed in an optical axis direction.

Figure 8:
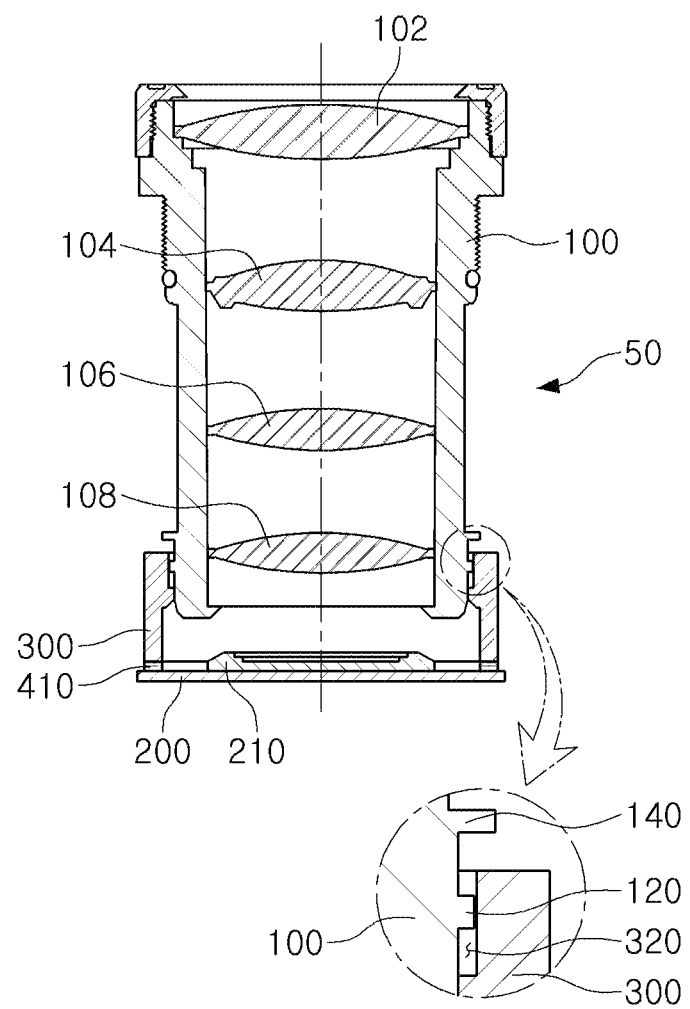
FIG. 8 is a configuration diagram of a fourth modified example of the camera module illustrated in FIG. 1.

A fourth modified example of the camera module will be described with reference to FIG. 8.

A camera module 50 includes a modified lens module 100 and a modified support member 300. For example, the lens module 100 and the support member 300 may be configured to enable the lens module 100 and the support member 300 to move in an optical axis direction.

A guide protrusion 120 and a guide groove 320 may be formed in the lens module 100 and the support member 300, respectively. The guide protrusion 120 is formed on an outer circumferential surface of the lens module 100 while the guide groove 320 is formed on an inner circumferential surface of the support member 300. The guide groove 320 is formed in a height direction (or an optical axis direction) of the support member 300. The guide protrusion 120 may be fitted into the guide groove 320.

As the camera module 50 configured as described above is limited in terms of a movement direction of the lens module 100 due to coupling of the guide protrusion 120 and the guide groove 320, the lens module 100 may be stably moved in the optical axis direction.

Figure 9:
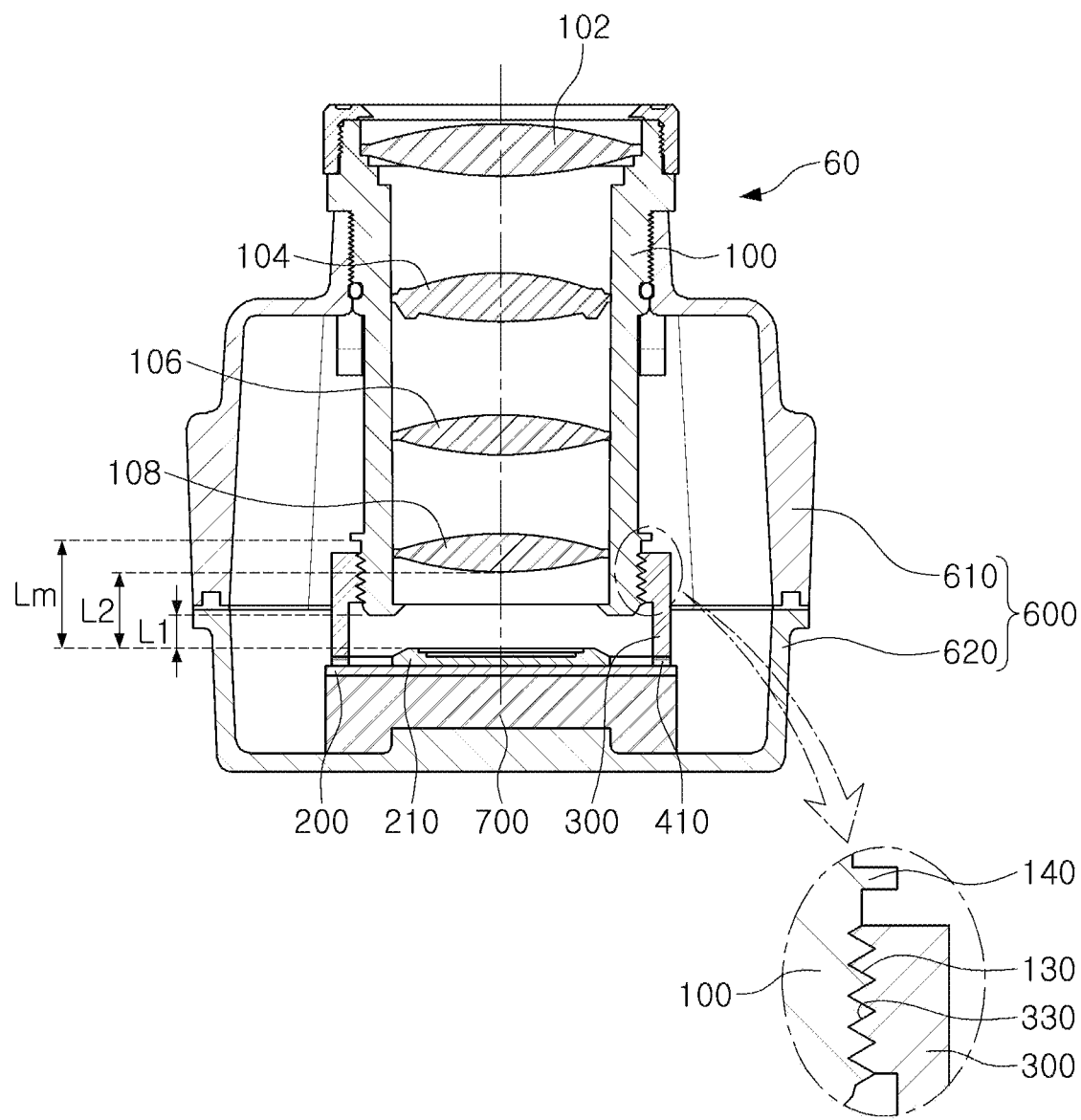
FIG. 9 is a configuration diagram of a camera module according to an example.

A camera module according to another example will be described with reference to FIG. 9.

A camera module 60 includes a lens module 100, a substrate 200 and a support member 300, but is not limited to such a configuration. For example, the camera module 60 may further include a housing 600 capable of integrally accommodating the lens module 100, the substrate 200 and the support member 300.

The lens module 100 may include one or more lenses 102, 104, 106 and 108. For example, the lens module 100 may consist of 4 lenses, but is not limited to such a configuration. The lens module 100 includes a constitution for being fastened to the support member 300. For example, a thread 130 may be formed on an outer circumferential surface of the lens module 100.

The lenses 102, 104, 106 and 108 may configure a single optical system capable of exhibiting certain optical characteristics. For example, a first lens 102, a second lens 104, a third lens 106 and a fourth lens 108 may configure a telephoto optical system capable of remote image capturing. The lenses 102, 104, 106 and 108 may have refractive power. For example, the first to fourth lenses 102 to 108 may each have positive or negative refractive power. The lenses 102, 104, 106 and 108 may each have a convex or concave refracting surface. For example, at least one of an object side surface and an image side surface may have a convex or concave shape. The optical system configured by the first to fourth lenses 102 to 108 may have a predetermined BFL.

The substrate 200 may provide a space in which an electric component is built. For example, an image sensor 210 and a passive element may be built in the substrate 200. The image sensor 210 may convert an optical signal refracted by the optical system into an electric signal. The image sensor 210 may be provided in the form of a CCD.

The support member 300 may be configured to maintain a distance between the lens module 100 and the image sensor 210 in a predetermined distance. For example, the support member 300 is disposed between the lens module 100 and the substrate 200 to keep the lens module 100 and the image sensor 210 in a predetermined distance.

The support member 300 includes a constitution for being fastened with the lens module 100. For example, a thread 330 may be formed on an outer circumferential surface of the lens module 300. Accordingly, a position of the lens module 100 with respect to the support member 300 may be changed as the lens module 100 rotates. As an example, when the lens module 100 is rotated clockwise, a distance between the lens module 100 and the image sensor 210 may be reduced. In contrast, when the lens module 100 is rotated counterclockwise, the distance between the lens module 100 and the image sensor 210 may be increased.

The lens module 100 may include a configuration capable of defining a minimum distance between the lens module 100 and the image sensor 210. For example, a protrusion 140 elongating in a direction intersecting an optical axis may be formed in the lens module 100. The protrusion 140 may be in contact with the support member 300. For example, the protrusion 140, which has been moved toward the image sensor 210 side by a predetermined distance Lm, may be in contact with the support member 300 not to allow the lens module to additionally move.

The camera module 60 includes a constitution for firmly maintaining coupling between members. For example, the camera module 60 may include first adhesive member 410.

The first adhesive member 410 can firmly maintain coupling between the substrate 200 and the support member 300. For example, the first adhesive member 410 is applied between the substrate 200 and the support member 300 to firmly fix a position of the support member 300 with respect to the substrate 200.

The housing 600 is configured to accommodate the lens module 100, the substrate 200 and the support member 300. The housing 600 includes a first housing 610 and a second housing 620. The first housing 610 is coupled to the lens module 100 and the second housing 620 is coupled to the substrate 200. The second housing 620 may include a bracket 700 for supporting the substrate 200. The bracket 700 may be configured to dissipate heat generated from the substrate 200, while supporting the substrate 200.

The housing 600 may fix a relative position of the image sensor 210 with respect to the lens module 100. For example, the first housing 610 coupled to the lens module 100 is coupled to the second housing 620 coupled to the substrate 200 to firmly maintain the positions of the substrate 200 and the image sensor 210 with respect to the lens module 100.

Figure 10A:
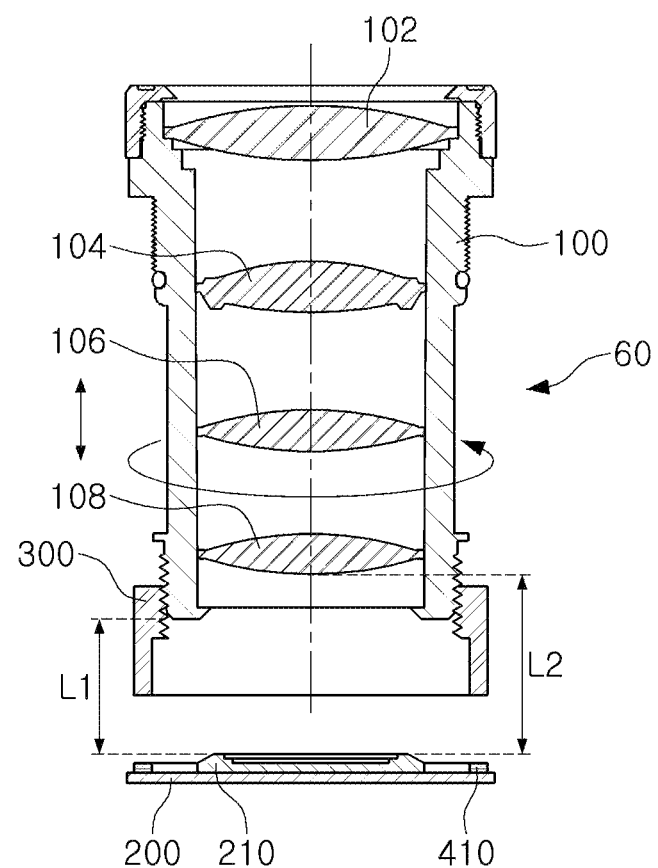
FIGS. 10A and 10B are diagrams illustrating an assembly process of the camera module illustrated in FIG. 9.
Figure 10B:
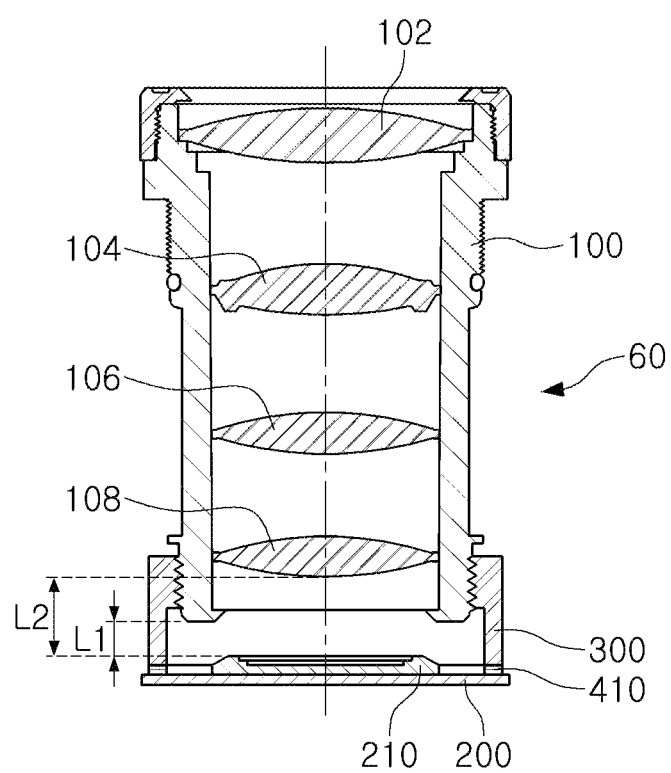

An assembly process of the camera module will be described with reference to FIGS. 10A and 10B.

A camera module 60 according to the example is configured to adjust a distance between the lens module 100 and the image sensor 210. For example, the camera module 60 may vary a distance between a lower portion of the lens module 100 and the image sensor 210 through an assembly process of the lens module 100, the substrate 200 and the support member 300 in order.

A first rear distance L1 from the lower portion of the lens module 100 to the image sensor 210 may be adjusted through several assembly processes. For example, the first rear distance L1 may be adjusted in a first assembly process in which the lens module 100 and the support member 300 are assembled and a second assembly process in which the substrate 200 and the support member 300 are assembled.

The first rear distance L1 may be adjusted to be large during the first assembly process. For example, the first rear distance L1 may be adjusted by moving the lens module 100 in an upper direction or a lower direction with respect to the support member 300. During the first assembly process, the first rear distance L1 may be adjusted such that a deviation between the BFL and a second rear distance L2 (a distance between the image sensor 210 and an image side surface of a fourth lens 108) falls within a first set range (0.2 mm to 0.3 mm).

The first rear distance L1 may be adjusted to have a minute size during the second assembly process. For example, the first rear distance L1 may be adjusted by adjusting a distance between the substrate 200 and the support member 300. During the second assembly process, the first rear distance L1 may be adjusted such that the deviation between the BFL and the second rear distance L2 falls within a tolerance range. When the first rear distance L1 is determined through a movement of the support member 300, a first adhesive member 410 may be applied between the substrate 200 and the support member 300. Alternatively, the first rear distance L1 may be adjusted by moving the supporting member 300 while having the first adhesive member 410 applied between the substrate 200 and the support member 300.

The camera module 60 manufactured through the assembly process as described above may achieve a high resolution as the distance from the lens module 100 to the image sensor 210 is adjusted in multiple steps. For example, the camera module 60 according to the example may match the second rear distance L2 with the BFL of the optical system constituting the lens module 100, thereby alleviating resolution degradation caused by a mismatch of the BFLs.

Hereinbelow, modified examples of the camera module will be described. For reference, components the same as those of the examples in the following drawings use the same reference numerals, and detailed descriptions of these components, will be omitted.

Figure 11:
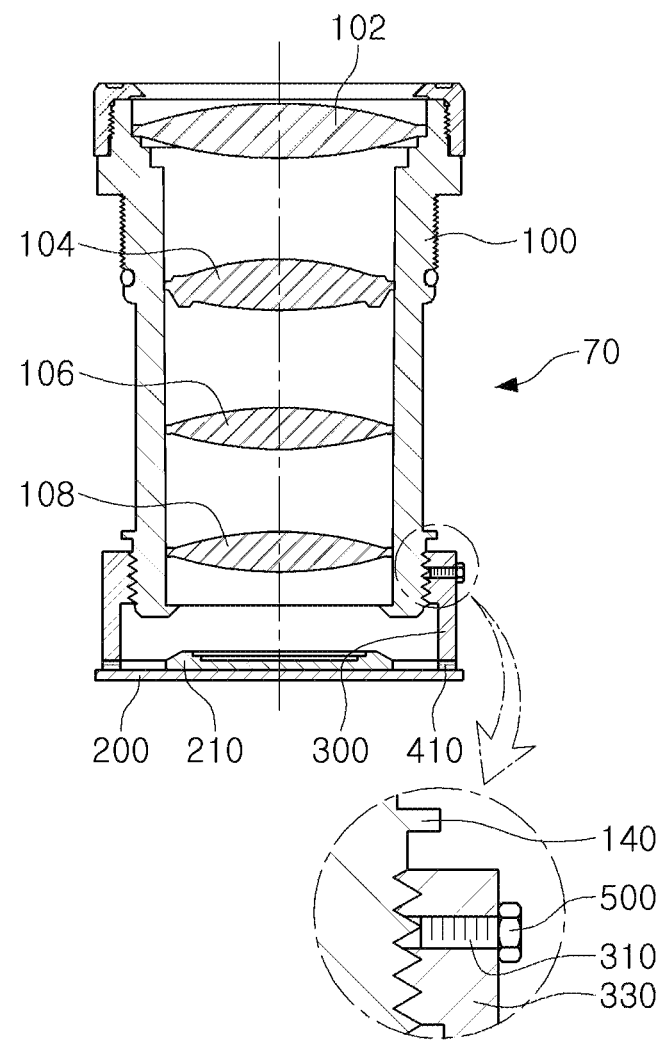
FIG. 11 is a configuration diagram of a first modified example of the camera module illustrated in FIG. 9.

A first modified example of the camera module of FIG. 9 will be described with reference to FIG. 11.

The camera module 70 includes a particular constitution for binding the lens module 100 and the support member 300. For example, the camera module 70 may include a bolt 500 as a type of a fastener.

The bolt 500 may be fastened to the support member 300. The bold 500 may be selectively in contact with the lens module 100. For example, the bolt 500 may penetrate the support member 300 and elongate to an outer circumferential surface of the lens module 100. However, the bolt 500 is not always in contact with the lens module 100. For example, the bolt 500 and the lens module 100 may not be in contact with each other in a process of moving the lens module 100 in the optical axis direction for adjustment of a rear distance.

The camera module 70 configured as described above may firmly bind the lens module 100 and the support member 300 through the bolt 500.

Figure 12:
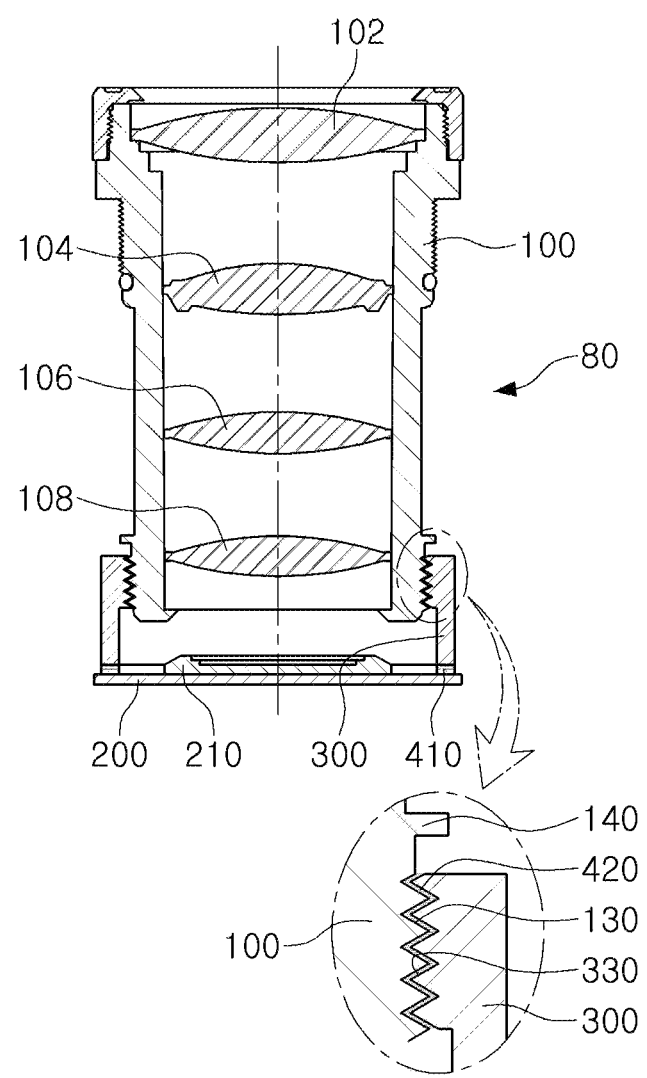
FIG. 12 is a configuration diagram of a second modified example of the camera module illustrated in FIG. 9.

A second modified example of the camera module of FIG. 9 will be described with reference to FIG. 12.

The camera module 80 includes a particular constitution for binding the lens module 100 and the support member 300. For example, the camera module 80 may include a second adhesive member 420 for maintaining coupling of the lens module 100 and the support 300.

The second adhesive member 420 may be introduced to a contact surface of the lens module 100 and the support member 300. For example, the second adhesive member 420 may be introduced between the thread 130 of the lens module 100 and the thread 330 of the support member 300.

As set forth above, the examples may provide a camera module in which a distance between a rear lens and an image sensor can be easily adjusted.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module configured to accommodate a lens;
a substrate;
an image sensor disposed on the substrate;
a support member coupled to the lens module to define a gap between the image sensor and the lens module;
a first adhesive member fixing a location of the support member with respect to the substrate;
a second adhesive member fixing a location of the lens module with respect to the support member;
a first housing coupled to the lens module; and
a second housing configured to accommodate the substrate and coupled to the first housing,
wherein the lens module comprises a protrusion that extends outwardly from an outer circumferential surface of the lens module in a direction intersecting an optical axis to define a minimum distance between the lens module and the image sensor along the optical axis, and the protrusion is disposed on an object-side of the support member, and
wherein the second adhesive is disposed between the protrusion of the lens module and the support member.

2. The camera module of claim 1, wherein a first groove configured to accommodate the second adhesive member is disposed in the support member or the lens module.

3. The camera module of claim 2, wherein the first groove is elongated from an outer circumferential surface of support member toward an outer circumferential surface of the lens module.

4. The camera module of claim 2, wherein the first groove is disposed in a contact region of the lens module and the support member.

5. The camera module of claim 2, wherein the first groove is formed in a spiral shape on an outer circumferential surface of the lens module or an inner surface of the support member.

6. The camera module of claim 5, wherein the first groove extends along an optical axis direction of the lens module.

7. The camera module of claim 1, wherein the lens module comprises a guide protrusion and the support member comprises a guide groove configured to interact with the guide protrusion to guide a movement of the lens module in an optical axis direction.

8. The camera module of claim 1, wherein the support member has a first thickness along a direction perpendicular to an optical axis at an object-side end of the support member and a second thickness, which is different from the first thickness, along the direction perpendicular to the optical axis at an image-side end of the support member.

9. The camera module of claim 8, wherein the first thickness is greater than the second thickness.

10. The camera module of claim 8, wherein the first adhesive member is disposed between the image-side end of the support member and the substrate along a direction parallel to the optical axis.

11. The camera module of claim 8, wherein the second adhesive member is disposed between the object-side end of the support member and the lens module along a direction parallel to the optical axis.

12. The camera module of claim 8, wherein the second adhesive member is disposed between the object-side end of the support member and the lens module along the direction perpendicular to the optical axis.

13. The camera module of claim 8, wherein the second adhesive member is disposed between the object-side end of the support member and the lens module along a direction parallel to the optical axis and along the direction perpendicular to the optical axis.

14. A camera module, comprising:
a lens module configured to accommodate a lens;
a support member configured to accommodate a portion of the lens module;
a first adhesive member coupling a substrate with the support member;
a fastener configured to fasten the lens module to the support member;
a first housing coupled to the lens module; and
a second housing configured to accommodate the substrate and coupled to the first housing,
wherein the lens module comprises a protrusion that extends outwardly from an outer circumferential surface of the lens module in a direction intersecting an optical axis to define a minimum distance between the lens module and the substrate along the optical axis, and the protrusion is disposed on an object-side of the support member, and
wherein the second adhesive is disposed between the protrusion of the lens module and the support member.

15. The camera module of claim 14, wherein the fastener is formed in one or both of the lens module and the support member in a spiral shape.

16. The camera module of claim 14, wherein the fastener comprises a bolt configured to penetrate the support member and elongated to an outer circumferential surface of the lens module.

17. The camera module of claim 14, further comprising a second adhesive member disposed between the lens module and the support member.